UNITED STATES PATENT OFFICE.

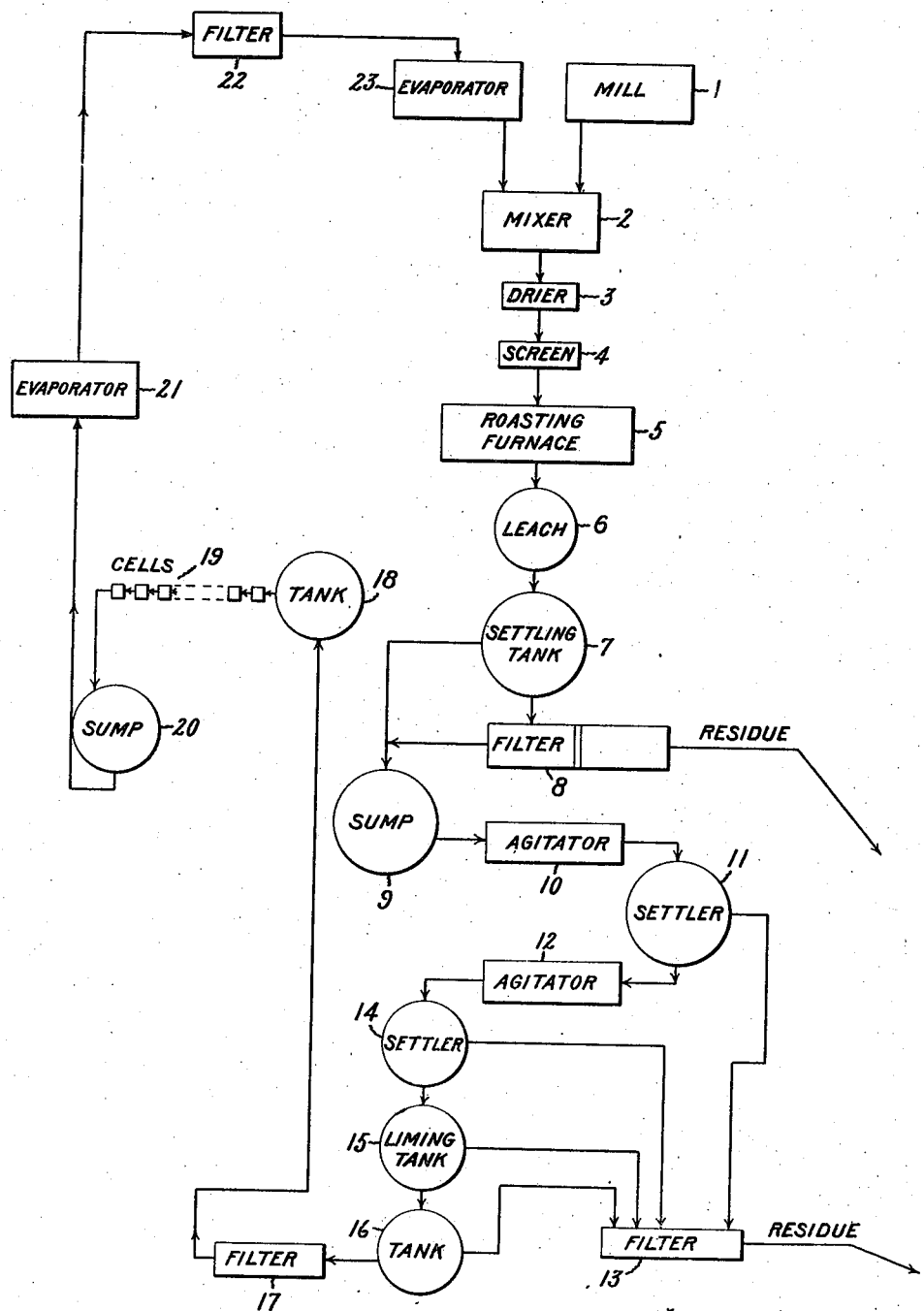

HERBERT R. HANLEY, OF WINTHROP, CALIFORNIA, ASSIGNOR TO BULLY HILL COPPER MINING & SMELTING COMPANY, A CORPORATION OF NEW JERSEY.

ZINC-EXTRACTION PROCESS.

1,241,966.        Specification of Letters Patent.        Patented Oct. 2, 1917.

Application filed June 5, 1916. Serial No. 101,724.

*To all whom it may concern:*

Be it known that I, HERBERT R. HANLEY, a citizen of the United States, residing at Winthrop, in the county of Shasta, State of California, have invented certain new and useful Improvements in Zinc-Extraction Processes, of which the following is a specification.

The present invention relates to the hydrometallurgy of zinc, and more particularly to the extraction of zinc from zinkiferous materials by a process involving the electrolysis of a zinc salt solution and the utilization of the acid regenerated by the electrolysis for the treatment of additional quantities of zinc ore.

It is one of the objects of my invention to increase by an acid roast the amount of water soluble zinc compounds in roasted ore, or raw oxidized zinc ore. It is another object of my invention to provide a process permitting economical removal of arsenic, antimony, selenium, tellurium, bismuth, and kindred metals. Still another object of my invention is to economically produce and purify, as a by-product of the process, sulfuric acid for treating the raw material, thereby rendering the process continuous or cyclical. Other advantages of my invention will appear hereinafter.

The accompanying diagram illustrates the steps of one embodiment of my invention.

My invention is applicable to ore which has been subjected to a primary roast, for example, a sulfid ore which has been roasted to oxidize sulfur and convert part of the sulfid to sulfate, or an ore in which zinc is originally present as an oxygen-containing compound, for example, a zinc carbonate ore. Both kinds of ore will be herein referred to as "oxidized ore." In the case of the latter class of ore, a primary oxidizing roast is unnecessary. A zinc ore may contain the following substances besides zinc and a gangue material: lead, copper, cadmium, arsenic, antimony, iron, bismuth, sulfur, tellurium and selenium. There may also be present some silver and gold.

Oxidized zinc ore, zinc fume, or other zinkiferous material may be first crushed if necessary to a suitable size in a mill 1 and to the ore concentrated sulfuric acid, in excess of the theoretical equivalent amount, is added in a mixer 2 and stirred to form a thick mud. One hundred pounds of oxidized ore is mixed with a more or less concentrated sulfuric acid solution containing about 28.8 pounds of sulfuric acid. The acid preferably should have a concentration of about 50% $H_2SO_4$. This acid mud is dried by exposure to the air, and then preferably is conveyed to a flue drier 3 heated with gases and dried for one-half day. The dried material is broken up to go through a coarse screen 4 of about $\frac{1}{2}''$ mesh and then transferred to a suitable roasting furnace 5, for example, a wedge type furnace. The ore is heated or baked to about 260° C. at the cool end to 500° C. at the hot end to convert zinc compounds to water soluble sulfates, and to volatilize arsenic, selenium and the like, if present. The temperature of the cool end of the furnace may be as low as 200° C. and the maximum temperature in the furnace may be as high as 650° C. Alkali and alkaline earth compounds, such as sodium, calcium and magnesium compounds are also converted to sulfates. Iron is largely converted to insoluble compounds, such as $Fe_2O_3$ or $FeO$ or basic sulfates.

Zinc compounds are substantially all converted to soluble zinc sulfate, which are leachable with water. In the primary roast a certain amount of zinc is converted to insoluble compounds, for example, in iron-containing ores there are formed ferrites of zinc not leachable with dilute sulfuric acid at ordinary temperatures.

The acid roasted product is leached with water, preferably while still hot, in a paddle agitator 6, or other suitable leaching device. The solution obtained by the leach preferably should have a specific gravity of about 1.27. The primary solution obtained from the leach contains sulfates of zinc, copper, cadmium, iron, magnesium, sodium, manganese and traces of other metals besides some suspended insoluble material. After clarification by settling in a tank 7 and filtration in a filter 8 of the sediment, the clear solutions are conveyed to a sump 9. The residue on the filter is rejected as indicated in the diagram. The metals more electronegative than zinc are first removed either by agitation of the solution with granular zinc, or by electrolysis below the critical voltage at which zinc is deposited. For example, the copper is first electrolyzed out with voltage of about 1.8 volts, the electrolyte being meanwhile agitated. The electrolyzing potential is then raised to about 2.2 volts with continued air agitation to remove cadmium. In the diagram the solution is shown as passing through a zinc agitator 10, a settler 11 and a second zinc agitator 12. The sediment from settling tanks 11 and 14 passes through a filter 13, the precipitate being carried away as indicated. The clear solution is treated in a tank 15 with lime, preferably as a carbonate, such as powdered limestone in conjunction with minute air bubbles to precipitate iron, as a hydrate. Manganese may, if desired, also be precipitated at this stage by adding an oxidizing compound, for example, calcium, permanganate, or other alkali permanganate in a tank 16, and the precipitate is removed by decantation and filtration through the filter 13. The precipitate is rejected as indicated.

The zinc sulfate electrolyte is fed through a clarifying filter 17, a tank 18, feeding the electrolytic cells 19. It is here electrolyzed with anodes insoluble in sulfuric acid for example, lead anodes, and cathodes which will withstand corrosion when the electrolysis is carried to a high concentration of sulfuric acid, for example a cathode of aluminum or electrolytic zinc, preferably the former.

The electrolysis is continued with air agitation until the electrolyte is largely exhausted of zinc sulfate. The particular value to which the zinc sulfate content of the electrolyte should be reduced depends somewhat on the subsequent purification of the depleted electrolyte necessary to remove such substances as magnesium or sodium sulfate. I prefer to electrolyze a zinc sulfate solution containing about 120 grams of zinc sulfate per liter to about 1.5 to 2 grams per liter when the power cost is low enough to permit of this degree of depletion. Ordinarily I may say that the electrolysis is continued until all but about 2 to 25 grams, and preferably all but 10 to 20 grams of the zinc content of the electrolyte has been electrolyzed, and a corresponding amount of sulfuric acid has been produced.

The spent electrolyte containing in addition to the residue of zinc sulfate, impurities such as the sulfates of alkli metals, magnesia and other metals which may escape the purification steps, is collected in a sump 20 and fed to an evaporator 21. Evaporation is carried out until some or all of these sulfates crystallize out which are less soluble than zinc sulfate. For example, a concentration, say from 100 gallons to 32 gallons will cause the largest part of the magnesium sulfate to crystallize out. By going to a very low zinc sulfate content in the electrolysis and evaporating the spent electrolyte to still greater concentration, still larger portions of magnesium sulfate and substantial amounts of the alkali metals can be crystallized out. The crystallized sulfates are removed by filtration in a filter 22.

The amount of sulfuric acid lost in the cycle by removal from the electrolyte as sulfate of magnesium, sodium and the like is compensated by the sulfate of zinc formed in the primary roast, particularly when iron is present in the ore. In the event that the sulfates in the ore are in excess of the amount required to furnish the sulfuric acid lost during the cycle, sulfuric acid should be removed. This may be the case when either the soluble sulfates in the ore or the sulfates formed in the primary roast are unusually high. The evaporation of the depleted electrolyte in that event is carried to a point approximating the concentration of marketable sulfuric acid, for example, acid of a specific gravity of 1.82 to 1.84 containing 1700 to 1800 grams of sulfuric acid, $H_2SO_4$ per liter.

The purified sulfuric acid residue otherwise, is evaporated in an evaporator 23, for example, to about 50% sulfuric acid content. This acid is then mixed with additional quantities of zinc ore, zinc fume or other zinc bearing material, as already explained above. This mixture is dried, roasted, extracted with water and the process repeated.

It may be desirable to mix a highly concentrated zinc bearing material with the acid solution at a greater sulfuric acid concentration, say 75 to 93% $H_2SO_4$, in order to combine with bases without producing too wet a mixture.

It may be desirable, also, to use a similarly concentrated acid solution with a lower grade zinc bearing material to avoid a muddy mixture thereby facilitate drying.

What I claim as new and desire to secure by Letters Patent of the United States, is:—

1. The process of extracting zinc from zinc-bearing material containing arsenic, antimony, selenium, tellurium, bismuth or the like, which consists in treating said materials with sulfuric acid, roasting at a temperature at which the zinc compounds are converted to zinc sulfate, and arsenic, selenium and the like are volatilized, leaching the product with water to dissolve soluble constituents, electrolyzing the solution to largely decompose the zinc sulfate forming zinc and sulfuric acid, concentrating the spent liquor, and utilizing the same for roasting with fresh quantities of zinc-bearing material.

2. The process of extracting zinc from zinkiferous material containing arsenic, antimony, selenium, tellurium, bismuth or the like, which consists in treating said material with a quantity of sulfuric acid in excess of the theoretical amount necessary to complete the reaction, roasting the material thus treated at a temperature high enough to volatilize the arsenic, selenium, or the like, leaching the product with water, electrolyzing the solution to generate zinc and sulfuric acid, concentrating the sulfuric acid until it will form a thick mud when mixed in excess with zinc-bearing material to repeat the process.

3. The process of extracting zinc from zinc-bearing materials which consists in treating said material with sulfuric acid, roasting at a temperature high enough to volatilize arsenic, selenium or the like, leaching the roasted material with water, electrolyzing the zinc sulfate solution until about 70 to 90% of the zinc sulfate has been decomposed and concentrating the acid solution to precipitate dissolved sulfates.

4. The process of extracting zinc from zinc-bearing materials containing arsenic, antimony, selenium, tellurium, bismuth or the like, which consists in roasting said material with a substance containing a sulfuric acid radical, leaching the product to dissolve zinc sulfate, electrolyzing the solution until the zinc sulfate has been depleted to such a low value that by subsequent concentration impurities may be largely precipitated before residual zinc sulfate is precipitated, whereby zinc and sulfuric acid are generated, concentrating the spent solution, to precipitate dissolved sulfates and the like and purifying the sulfuric acid by the removal of said precipitate.

5. The process of extracting zinc from zinkiferous materials which consists in deriving a zinc sulfate solution from said materials, electrolyzing a solution of zinc sulfate until the electrolyte has been substantially depleted of zinc sulfate with the formation of zinc and sulfuric acid, concentrating said electrolyte until impurities other than zinc sulfate are precipitated and utilizing the electrolyte in the concentrated form for treating fresh portions of zinc-containing materials to produce zinc sulfate.

6. The process of extracting zinc from zinkiferous materials which consists in electrolyzing a solution of zinc sulfate, the negative electrode being adapted to resist the chemical action of a strongly acid electrolyte, continuing the electrolysis until the zinc sulfate has been largely electrolyzed to form zinc and sulfuric acid, concentrating the electrolyte until impurities separate therefrom, removing the precipitated impurities, and using the concentrated acid to treat fresh portions of zinc-bearing material.

7. The process of extracting zinc from zinkiferous material containing arsenic and antimony, which consists in mixing the ores with a chemical excess of sulfuric acid at a concentration adapted to form a thick mud, drying the mud, roasting at a temperature of about 200 to 650° C. to drive off arsenic, selenium and other volatile elements, extracting the roasted product with water, electrolyzing the solution to largely recover sulfuric acid, concentrating the acid and utilizing the concentrated acid for the treatment of fresh portions of ore.

8. The process of extracting zinc from materials containing zinc, arsenic, antimony, magnesium, iron alumina, silica and copper, selenium, tellurium, bismuth, which consists in mixing said materials with sulfuric acid, drying the product, roasting to a temperature of about 260 to 500° C. thereby driving off arsenic, selenium or other volatile elements, extracting the soluble portion of the roasted material, removing iron, alumina, silica and copper from the solution, electrolyzing the purified zinc sulfate to convert most of the same to zinc and sulfuric acid, concentrating the spent electrolyte to substantially the saturation value of residual zinc sulfate, and removing magnesium and other sulfates from the concentrated acid.

9. In the recovery of metallic zinc from zinc-bearing material containing arsenic as an impurity the steps which consist in recovering sulfuric acid from the electrolysis of a zinc sulfate electrolyte, concentrating and purifying said acid, mixing the same with the zinc-bearing material, drying the mixture, roasting the same to drive off arsenic and convert metal constituents to sulfates and leaching the product with water to remove soluble constituent comprising the zinc as a sulfate.

10. In the electrolytic extraction of zinc from a solution of zinc sulfate containing magnesium sulfate, the process which consists in electrolyzing said solution by the use of an aluminum cathode until the zinc sulfate has been reduced to such a low value that in the subsequent evaporation of the electrolyte the magnesium sulfate will be largely crystallized out before the crystallization of zinc sulfate, evaporating the spent electrolyte until the magnesium sulfate has precipitated, filtering the acid liquor from the magnesium sulfate crystals, and continuing the concentration of the solution to a desired point.

11. In the recovery of metallic zinc from zinc-bearing material containing arsenic, the steps which consist in mixing said material with a sulfuric acid solution containing at least about 50% acid to form a mud, drying said mixture, roasting to drive off arsenic and convert zinc and other metal constituents to sulfates, extracting with water, removing iron, alumina, silica, copper and other metallic impurities from said solution, electrolyzing the purified solution to a zinc content so low that sulfuric acid may be deprived of impurities without substantial loss of residual zinc sulfate, purifying and concentrating the sulfuric acid.

12. The process of extracting zinc from zinkiferous material which consists in mixing concentrated sulfuric acid with said material roasting the mixture to convert zinc compounds to zinc sulfate, leaching the product with water, removing metals more electro-negative than zinc, electrolyzing the solution to largely decompose the zinc sulfate thereby depositing zinc and setting free sulfuric acid, evaporating the spent electrolyte until dissolved salts are precipitated, separating sulfuric acid from the precipitated impurities and utilizing said acid at least in part for the treatment of fresh quantities of zinc ore.

In witness whereof, I have hereunto set my hand this twenty-second day of May, 1916.

HERBERT R. HANLEY.